Figure 1:
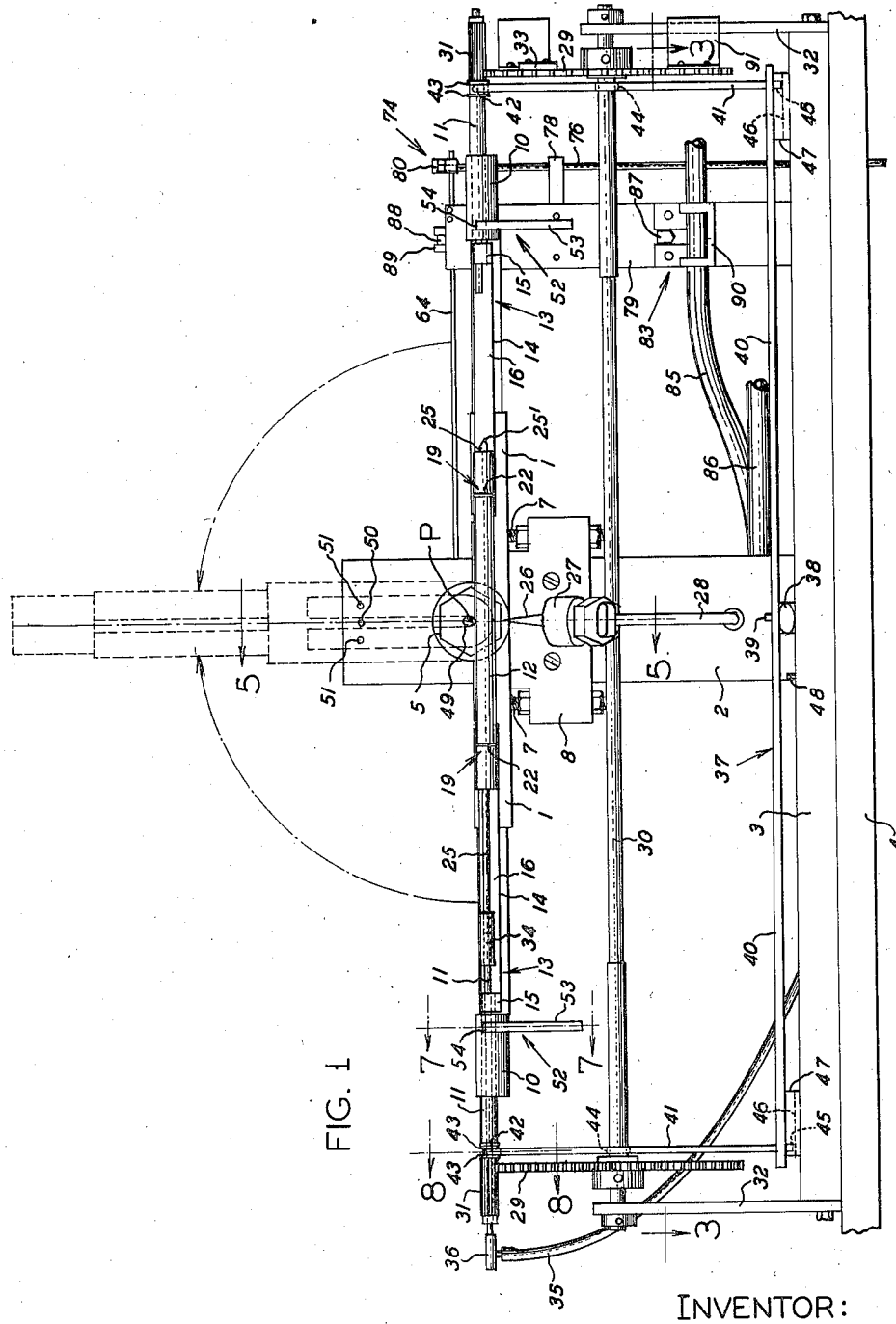

April 20, 1948.	E. B. NOEL	2,439,902
GLASS TUBE BENDING APPARATUS
Filed March 30, 1946	4 Sheets-Sheet 1

INVENTOR:
EDWARD B. NOEL,
BY John H Anderson
HIS ATTORNEY

April 20, 1948. E. B. NOEL 2,439,902
GLASS TUBE BENDING APPARATUS
Filed March 30, 1946 4 Sheets-Sheet 2

FIG. 2

FIG. 3

INVENTOR:
EDWARD B. NOEL,
BY John Henderson
HIS ATTORNEY

April 20, 1948.   E. B. NOEL   2,439,902
GLASS TUBE BENDING APPARATUS
Filed March 30, 1946   4 Sheets-Sheet 3

INVENTOR:
EDWARD B. NOEL,
BY John H Anderson
HIS ATTORNEY

INVENTOR:
EDWARD B. NOEL,
BY John H Henderson
HIS ATTORNEY

Patented Apr. 20, 1948

2,439,902

UNITED STATES PATENT OFFICE 2,439,902

GLASS TUBE BENDING APPARATUS

Edward B. Noel, Cleveland Heights, Ohio, assignor to General Electric Company, a corporation of New York Application March 30, 1946, Serial No. 658,398

12 Claims. (Cl. 49—7)

My invention relates to apparatus for bending glass tubing and more particularly to apparatus for forming an angular bend in a glass tube. The apparatus is particularly useful in the formation of U-shaped glass tubes such as are used to form the envelopes of certain types of electric discharge devices, such as germicidal lamps, for instance.

The bending of glass tubes into U-shape, when performed by hand, ordinarily requires the services of a highly skilled glass worker. This is particularly true where it is desired to obtain U-tubes of uniform final shape. Such hand bending of glass tubes, however, besides being slow and difficult, is also a costly operation. Moreover, where the glass U-tube is to be used as the envelope for an ultraviolet emitting discharge device such a germicidal lamp, it is highly desirable that the wall thickness of the glass tube be as thin as possible in order to minimize absorption of the ultraviolet radiations by the glass. Since, in bending glass tubing, the glass at the outer or convex side of the bend tends to stretch and thin out, the formation of satisfactory glass U-tubes, and particularly U-tubes having a sharp bend, from such thin walled tubing therefore requires the exercise of special bending procedure which will insure sufficient glass wall thickness at the outer side of the U-bend to withstand all ordinary impacts to which such portion of the tube may be subjected during the normal use of the device. Furthermore, in bending glass tubes into U-tubes of the type having a very sharp bend, i. e., with their legs extending closely alongside one another, the glass at the inner side of the bend is apt to buckle or corrugate during the bending operation because of the excessive compression to which it is subjected during such operation.

One object of my invention is to provide apparatus for forming an angular bend in glass tubes and the like by means of which such tubes may be quickly and accurately bent into uniform shape without collapsing of the tube at the point of bend.

Another object of my invention is to provide apparatus of the above type for bending glass tubes into uniform U-shape, and particularly into U-tubes having a very sharp bend, without buckling the glass at the inner side of the bend.

Still another object of my invention is to provide apparatus for bending thin walled glass tubing into U-shape to thereby form thin walled glass U-tubes having sufficient strength at the point of bend to withstand all ordinary impacts.

A further object of my invention is to provide apparatus of the above type which is simple and inexpensive and which will not require skilled labor to operate.

Figure 4:
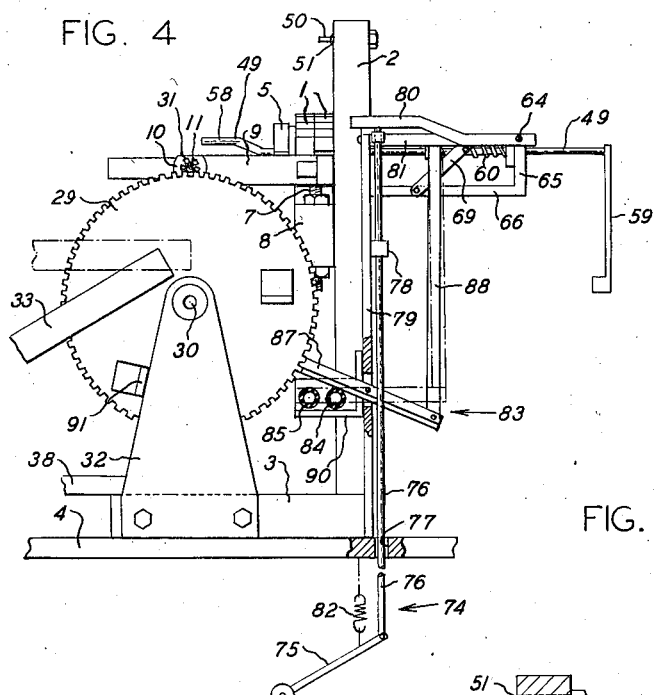
Figure 7:
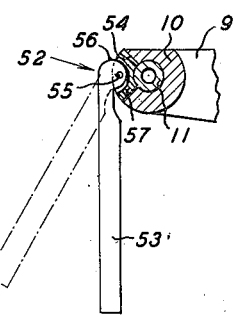
Figure 8:
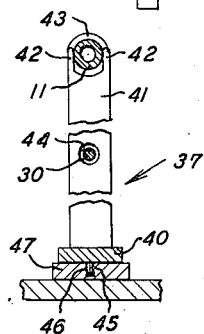
Figure 5:
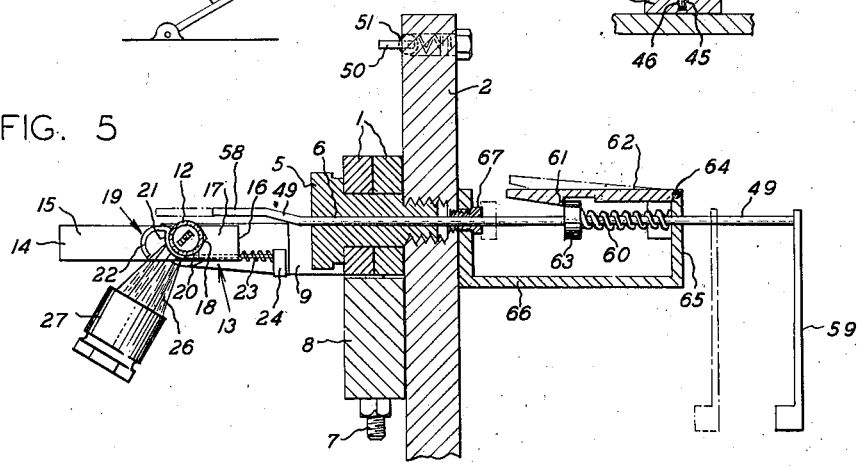
Figure 6:
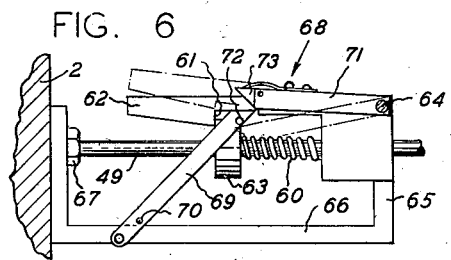
Figure 9:
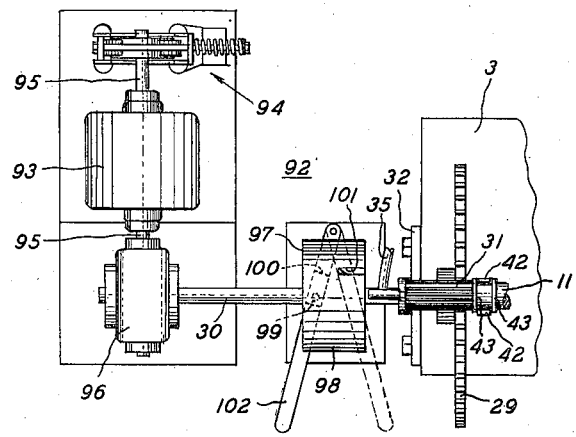
Figure 10:
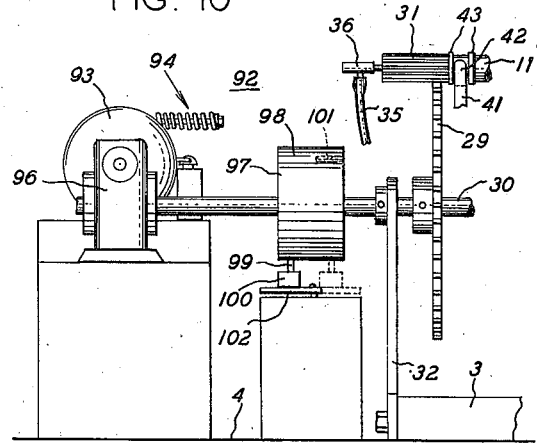

Further objects and advantages of my invention will appear from the following description of a species thereof and from the accompanying drawing in which:

Fig. 1 is a front elevation of apparatus comprising my invention; Fig. 2 is a plan view thereof; Fig. 3 is a horizontal section on line 3—3 of Fig. 1 and showing in plan the mechanism for reciprocating the glass tube holders towards and away from one another as well as the pinch clamp for opening and closing the gas and oxygen lines leading to the gas fire burner; Fig. 4 is an end elevation partly in section of the apparatus; Fig. 5 is a fragmentary transverse vertical section on line 5—5 of Fig. 1; Fig. 6 is an elevation of the operating mechanism for the pin around which the glass tube is bent; Figs. 7 and 8 are fragmentary sections on lines 7—7 and 8—8, respectively, of Fig. 1; and Figs. 9 and 10 are diagrammatic plan and front elevation views, respectively, of a motor driven arrangement for rotating the holders for the glass tube.

Referring to the drawings, the apparatus there shown comprises a pair of swivel arms 1, 1 pivotally mounted on a support or bracket 2 fastened to and upstanding from a rectangularly shaped bed plate or base 3 mounted on the table portion 4 of a bench or stand. The base 3 and bracket 2 constitute the frame of the machine. The swivel arms 1 are mounted to pivot about a common horizontal axis, the arms for that purpose being pivoted at one end on a headed stud 5 which is threaded into the bracket 2 and is provided with an axial bore 6 extending therethrough. As shown in Fig. 1, the swivel arms 1 are normally supported in positions extending horizontally away from each other by the engagement of the arms with the upper ends of stop screws 7 carried by a plate 8 fastened to the bracket 2. Adjacent their outer or free ends, the arms 1 carry forwardly extending brackets 9 provided with bearings 10 for hollow shafts 11 extending parallel to the arms. The shafts 11 protrude both inwardly and outwardly from their respective bearings 10 and in axial alignment with one another when the swivel arms 1 are in their normal horizontal starting position in resting engagement with the stop screws 7. The shafts 11 are offset below the pivot center P (Fig. 1) of the swivel arms a distance at least equal to the outside radius of the glass tube 12 to be bent, the amount of offset determining the radius of the bend which is ultimately formed in the tube. In the particular case illustrated where the glass tube 12 is to be bent into U-shape with parallel leg portions, the coincident axes of the holder shafts 11 are offset with respect to the pivot point P of the swivel arms 1 a distance equal to one-half the distance between the center lines of the two parallel legs of the U-tube to be formed.

At their inner ends, the shafts 11 carry a pair of holders 13 for holding the glass tube 12 which is to be bent. The holders 13 are horizontally aligned with one another when the arms 1 are in their normal horizontal starting position. As shown more particularly in Fig. 2, the holders 13 each comprise an L-shaped support bracket 14 one arm 15 of which is fixedly secured to its respective support shaft 11 to thereby cause the holder 13 to rotate with the said shaft. The other arm 16 of the bracket 14 extends inwardly and parallel to its respective support shaft 11 and is formed at its inner or free end with a forwardly projecting block portion 17 the front face of which is provided with a V-groove 18 which extends longitudinally of the arm 16 and is adapted to receive the glass tube 12 therein. Spring clamps or hooks 19 mounted on the bracket arms 16 hold the glass tube 12 in place in the V-grooves 18. As shown more particularly in Fig. 5, each of the spring clamps 19 may comprise a length of wire 20 extending transversely through the bracket arm 16 with the portion projecting forwardly of said bracket arm formed into a hook 21 to engage and clamp around the front side of the glass tube 12. At the end of the hook 21, the wire 20 may be suitably bent to provide a finger grip portion, as indicated at 22 in Fig. 5. The wire hook 20 is normally urged rearwardly, to thereby clamp the glass tube 12 against the V-groove 18 in the bracket arm 16, by a compression coil spring 23 which surrounds the projecting rear portion of the wire 20 and is compressed between the rear side of the bracket arm 16 and a retainer 24 fastened on the wire.

The glass tubes 12 to be bent are each provided with exhaust tubes 25 extending longitudinally from each end of the tube. One of the said exhaust tubes is tipped off, as indicated at 25'. The tubes 12 are inserted in the holders 13 and are longitudinally adjusted to the proper position with respect to the pivot axes P of the swivel arms 1 by means of suitable graduations (not shown) on the holder bracket arms 14. Thus, where the tube 12 is to be bent into U-shape with legs of equal length, the tube 12 is centered longitudinally relative to the pivot axes P of the swivel arms 1.

After a glass tube 12 has been inserted and properly positioned in the holders 13, the portion of the tube where the bend is to be made (i. e., that portion lying in and adjacent to the vertical plane including the pivot axis P of the swivel arm 1) is heated to a plastic condition by a sharp gas fire 26 directed thereagainst from a burner 27 located slightly beneath and to the front of the tube 12. The burner 27 is connected by a rigid metal tube or pipe 28 to a source of a gaseous combustion admixture. The burner 27 is supported in place from the bracket 2 by means of the tubing 28 which for that purpose extends through and is secured to the said bracket.

During the heating of the glass tube 12 by the gas fire 26, the tube is rotated or oscillated about its longitudinal axis to thereby insure more or less uniform heating thereof around its circumference. The rotation or oscillation of the tube 12 is effected by suitable means, either automatically or manually operated, for rotating or oscillating the hollow shafts 11 and therefore the holders 13 carrying the glass tube 12 when the swivel arms 1 are in their lowered or horizontal starting position.

In the particular case illustrated, the said holder rotating means is of the manually operated type and comprises a pair of driving gears 29 which are fastened on a horizontally extending drive shaft 30 and which mesh with spur gears 31 on the holder support shafts 11 when the swivel arms 1 are in their lowered or horizontal starting position. The drive shaft 30, which underlies and extends parallel to the said holder support shafts 11 when the swivel arms 1 are in their said lowered position, is journaled in upstanding bearing brackets or end plates 32 fastened to the opposite ends of the base 3. One of the driving gears 29 (preferably the right hand gear as viewed from the front of the machine) is provided with a hand lever 33 which may be grasped by the operator and moved up and down to thereby oscillate the gear and its support shaft 30 and thus oscillate, in turn, the holders 13 and the glass tube 12 carried thereby.

To prevent collapsing of the glass tube 12 at the heated region thereof, air or other gas under a slight pressure may be introduced into the tube through the open or untipped exhaust tube 25 thereof. For this purpose, the said open exhaust tube 25 may be connected to the inner end of the adjacent hollow holder shaft 11 by means of a short rubber tube 34, and one end of a length of rubber tubing 35 connected to the outer end of the said shaft 11 by means of a suitable coupling 36. The other or free end of the tubing 35 may be provided with a mouthpiece (not shown) for the operator to blow into, or it may be connected through a push button valve to a source of compressed air.

After the glass of the tube 12 at the region of the proposed bend has become sufficiently plastic to be worked, the opposite ends of the tube are moved toward one another to thereby upset or thicken the glass at the said region preparatory to the actual bending of the tube. The said movement of the tube ends toward one another is effected by manually controlled means 37 operable to reciprocate the holder support shafts 11, and therefore the holders 13 themselves, towards and away from one another when the swivel arms 1 are in their lowered position. The said holder reciprocating means 37 comprises a hand lever 38 normally extending more or less transversely of and pivotally mounted on the base 3 to swing in a horizontal plane. The lever 38, which is pivoted on an upstanding pin 39 extending from the base 3 at a point intermediate its length, is pivotally connected on either side of its pivot point to a pair of horizontally disposed links or connector arms 40 which extend in the general direction of the length of the holder support shafts 11. At their outer ends the connector links 40 are provided with upstanding arms 41 the upper ends of which are bifurcated to provide yoke arms 42 (Fig. 8) which receive the shafts 11 and fit between annular flanges 43 thereon. The arms 41 are provided with apertures 44 through which the drive shaft 30 extends. The outer ends of the connector links 40 are also provided with depending guide pins 45 which are vertically aligned with the upstanding arms 41 and which ride in grooves 46 in guide blocks 47 fastened to the upper side of the base 3. The guide grooves 46 extend parallel to the holder support shafts 11 so as to cause the vertical arms 41 to move in a direction parallel to the holder support shafts 11 and thus axially move the said shafts and the holders 13 carried thereby when the hand lever 38 is pivoted. Adjustable stop means are preferably provided for limiting the extent of movement of the holders 13 towards one another so as to assure uniform upsetting of each glass tube 12 to be bent. The said stop means may comprise an upstanding pin 48 mounted on the base 3 and arranged to be engaged by the hand lever 38 when the latter is pivoted in a direction to move the holders 13 towards one another. A series of holes 48' are provided in the base 3 in any one of which the stop pin 48 may be inserted to thereby enable the setting of the pin in any one of a number of different positions, thus providing for a variation in the degree of upsetting of the glass, as desired. To maintain the meshed engagement of the spur gears 31 with the drive gears 29 and thus permit continuous rotation of the tube 12 during the axial movement of the shafts 11 by the hand lever 38 to upset the glass, the spur gears 31 are made of extended widths as shown in Figs. 1 and 2.

When the glass at the region of the proposed bend is sufficiently softened and gathered, the holders 13 are locked or clamped against any further movement longitudinally of the tube and also against any further rotation, a forming pin 49 moved into position across the upper side of the tube above the point where the bend is to be made, and the swivel arms 1 then swing upwardly through the desired angle to thereby bend the tube around the forming pin. In the particular case illustrated, the arms 1 are swung to a vertical up position, against a stop pin 50 extending from the bracket 2, so as to swing each half length of the tube through an angle of approximately 90 degrees and thus form a 180 degree total bend in the tube. The arms 1 are held in their raised position by spring pressed balls 51 which are mounted in the bracket 2 and snap into corresponding shallow depressions (not shown) in the arms 1.

The locking of the holders 13 against movement longitudinally of the glass tube 12 is effected by clamp means 52 which operate to clamp the holder support shafts 11, and therefore the holders 13, against such movement. Separate clamp means 52 are provided for each of the shafts 11, each clamp means comprising a hand lever 53 extending transversely of the respective shaft 11 and pivotally mounted on the shaft bearing 10 within a cross slot 54 therein, as shown in Fig. 7. The clamp lever 53 is pivoted at one end on a pivot pin 55 and normally rests in a vertical down or inoperative position. At its pivoted end, the lever 53 is provided with a circular cam or wedge surface 56 which is eccentric with respect to the pivot center of the lever and which engages and wedges a shoe 57 tightly against the shaft 11 upon upward pivotal movement of the lever. The shoe 57 is held within the slot 54 between the shaft 11 and the wedge surface 56 of the lever 53.

The forming pin 49 around which the glass tube 12 is bent preferably comprises a rod of material which will not corrode, such as stainless steel for instance. The pin 49 extends through the bore 6 in the stud 5 and is supported therein. Because of the close leg spacing of the U-tubes to be formed in the particular case illustrated, the portion 58 of the pin 49 which projects forwardly of the stud 5 is offset upwardly a slight amount (as shown in Fig. 5) so as to clear the glass tube 12 in the holders 13 when the pin is moved forwardly to its bending position overlying the said tube. A counterweight arm 59, attached to the projecting rear end portion of the pin 49 and extending downwardly therefrom, maintains the pin in a fixed rotative position with its front end portion 58 offset upwardly at all times.

As shown in full lines in Fig. 5, the forming pin 49 is normally held in a retracted or inoperative position, against the resistance of a compression coil spring 60 on the pin, by the engagement of a shoulder 61 on a latch 62 with a stop collar 63 on the pin. The latch 62 is pivoted at one end on a horizontal shaft 64 journaled in the upstanding rear leg 65 of a U-shaped bracket 66 fastened to the rear side of bracket 2, and the coil spring 60 is compressed between the said bracket leg 65 and the stop collar 63 on the pin 49. When the latch 62 is pivoted upwardly so as to disengage the shoulder 61 from in front of the stop collar 63, the expansive force of the coil spring 60 then advances the forming pin 49 to its forward or operative position with the stop collar 63 thereon in abutting engagement with a stop bushing 67 threaded into bracket 2, as shown in dotted lines in Fig. 5.

The upward pivotal movement of the latch 62 to release the forming pin 49 is effected by suitable release means 68 comprising a rearwardly inclined trip lever 69 (Fig. 6) pivoted at its lower end on the bracket 66 with its swinging or free upper end underlying and engageable with the underside of the latch 62. The trip lever 69 is normally held in a lowered pivotal position with the latch 62 resting thereon, as shown in full lines in Fig. 6, by the engagement of a stop pin 70 on the lever with the upper side of the bracket 66. In such lowered position of the trip lever 69, the latch 62 is free to be set in pin-locking position with its shoulder 61 engaging the stop collar 63 on the pin 49. The trip lever 69 is pivoted upwardly from its normal lowered position, to thereby lift the latch 62 and thus release the forming pin 49, by means of an operating arm 71 fixedly secured on the shaft 64 and extending more or less forwardly therefrom. As shown in solid lines in Fig. 6, the operating arm 71 is normally held in an elevated pivotal position overlying a pin or stud 72 extending laterally from the trip lever 69 and with which the arm 71 is adapted to engage to lift the trip lever. During the operation of the apparatus the arm 71 is first swung downwardly past the pin 72 on trip lever 69 to the position indicated in dotted lines in Fig. 6, the arm 71 being provided for such purpose with a pivotal pin-engaging spring catch 73 at its free end which pivots upwardly upon striking the trip lever pin 72 during the downward swinging movement of arm 71, so as to ride freely down over the said pin. On the subsequent return or upwardly swinging movement of the operating arm 71, the pivotal spring catch 73 positively engages the pin 72 on trip lever 69, thus pivoting the said lever upwardly so as to cause it to lift the latch 62 and thus release the forming pin 49.

The swinging movement of the operating arm 71 is conveniently effected by foot-operated mechanism 74 which rotates the shaft 64 on which the arm 71 is mounted. The said foot-operated mechanism 74 comprises a foot pedal 75 (Fig. 4) the swinging end of which is pivotally connected to a vertical push rod 76 which extends upwardly through an aperture 77 in the table 4 and is guided adjacent its upper end in a bearing 78 on an upstanding bracket 79 secured to the rear side of the base 3. The upper end of the push rod 76 underlies and engages a lever 80 extending more or less horizontally forward from and fixedly secured on the horizontal shaft 64 which, in addition to being journaled at one end in the leg 65 of bracket 66, is also journaled at its other end in a horizontal arm 81 extending rearwardly from the upper end of bracket 79. A tension coil spring 82, connected between the foot pedal 75 and the table 4, normally holds the foot pedal in its "up" position, thus also holding the operating arm 71 in its normal elevated position overlying the pin 72 on trip lever 69.

In addition to controlling the operation of the pin-releasing means 68, the foot pedal mechanism 74 also operates a gas fire control device 83 (Fig. 4) for opening and closing the main gas and air supply lines 84, 85 for the gas burner 27. As shown in Fig. 3, the said burner is supplied at all times with low pressure gas and air combustion admixture through a bypass line 86 to thereby provide a pilot flame which serves to start the main or heating fire 26 each time the main lines 84, 85 are opened. If desired, the pilot flame may be supplied by a separate burner located adjacent the heating burner 27. The gas fire control device 83 preferably comprises a more or less horizontally extending pinch clamp lever 87 which is pivotally mounted on the bracket 79 and is pivotally connected at its back end, by a vertically extending connecting rod 88, to an arm 89 secured to the shaft 64 and extending horizontally forward therefrom. The gas and air supply lines 84, 85, which are made of rubber tubing, extend transversely of the lever 87 and are supported on a holder bracket 90 in a position immediately underlying the forwardly extending portion of the said lever so that the rubber tubes 84, 85 will be pinched or squeezed shut between the lever 87 and the bracket 90 when the foot pedal 75 is in its "up" or released position. The holder bracket 90 for the rubber tubes 84, 85 is fastened to the upstanding bracket 79.

In the operation of the apparatus, the operator, after having set the forming pin 49 in its retracted or "back" position and inserted a glass tube 12 in the aligned holders 13, then depresses the foot pedal 75 so as to start the heating fires 26 from the burner 27 and also swing the operating arm 71 to its lowered pivotal position shown in dotted lines in Fig. 6. Simultaneously, the operator grasps the handle 33 on gear 29 and moves it up and down through a small arc to thereby oscillate the glass tube 12 and cause it to be heated uniformly therearound by the heating fires 26. When the glass has become softened, the operator pivots the hand lever 38 to its limiting position against the stop pin 48 (as indicated in dotted lines in Fig. 3) to thereby move the holders 13 toward each other and thus collect or upset the softened glass at the point of the proposed bend. During the softening period, air or some other gaseous medium is introduced into the glass tube 12 through the rubber tube 35 to prevent collapsing of the softened portion of the glass tube. When the glass has been thus softened and upset, the operator's foot is removed from the foot pedal 75 to cause the forming pin 49 to be released and moved to its forward or bending position and to also turn off the heating fires 26 from the gas burner 27. At the same time, the operator returns the holders 13 to their original rotative position, as determined by the engagement of a stop lug 91 on the gear 29 with the adjacent end plate 32. Immediately thereafter, the hand levers 53 of the clamp means 52 are grasped and first pivoted upwardly to clamp the holders 13 against any further rotative and longitudinal movement and then lifted to swing the swivel arms 1 upwardly against the stop pin 50 so as to effect the bending of the glass tube 12.

The forming pin 49 serves to round out the glass at the inner side of the bend. The pin 49 thus prevents the formation of an overly sharp bend in the glass at the inner side of the bend. Such a sharp bend would cause the glass to buckle or corrugate at the inner side of the bend due to the excessive compression of the plastic glass at such region. The forming pin 49 eliminates this condition by shaping the glass into a bend of larger radius than it otherwise would have if the forming pin were not present.

Figs. 9 and 10 illustrate a modification of the invention wherein the holders 13, instead of being oscillated by hand, are rotated in one direction during the heating period by automatic means 92 which, in the particular case illustrated, comprises an electric motor 93 mounted on the table 4 and provided with a conventional type magnetic brake 94 for instantaneously stopping rotation of the motor shaft 95 when the motor circuit is interrupted. The motor shaft 95 drives the holder drive shaft 30 through a speed reducer 96 of a type providing a high ratio of speed reduction, for instance fifty to one or thereabouts, so as to rotate the drive shaft 30 at a relatively low speed. Mounted on the drive shaft 30 is a cylindrical cam 97 on the surface 98 of which rides the push button 99 of a multipole double-throw switch 100. The said switch 100 is connected to control the operation of both the motor 93 and the magnetic brake 94. The cylindrical cam 97 is provided at one end with a notch or slot 101 in its periphery for receiving the push button 99 of the switch. The switch 100 is movable lengthwise of the cam 97 (i. e., lengthwise of shaft 30) to cause the push button 99 to ride either on the unnotched or notched portions of the cam surface 98, the switch for that purpose being mounted on a lever 102 pivotally mounted on the table 4. When the lever 102 is pivoted to a position (shown in full lines in Fig. 9) where the switch push button 99 rides on the unnotched end portion of the cam surface 98, the switch 100 closes the motor operating circuit to thereby start operation of the motor 93 which then rotates the holders 13 continuously. When it is desired to stop the rotation of the holders 13, the lever 102 is pivoted to the position (shown in dotted lines in Fig. 9) where the switch push button 99 rides on the notched end portion of the cam surface 98. Then, when notch 101 of the rotating cam 97 comes opposite the switch push button 99, the latter will snap into the notch, thus opening the motor circuit and simultaneously opening the solenoid circuit of the magnetic brake 94 so as to cause the said brake to set and quickly stop rotation of the motor shaft 95. The cam notch 101 is located at the proper position rotatively about the shaft 30 to stop the rotation of the holders 13 in their proper rotative position for the ensuing tube-bending operation. The magnetic brake 94 operates directly on the high speed shaft of the motor 93, and because of the high ratio gear reduction of the speed reducer 96, the stopping position of the machine will be sufficiently accurate in all cases to permit proper operation of the swivel arms 1 to bend the glass tube.

What I claim as new and desire to secure by Letters Patent of the United States is:

1. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, said holders being rotatably mounted on their respective support arms to rotate the glass tube about its axis, means for heating and softening a zone of the tube adjacent the pivot axis of said arms, and means cooperable with said holders to rotate them in unison, said arms being arranged to be swung about their pivot axis in a direction opposite to that in which the tube is offset from the said pivot axis to thereby bend the tube.

2. Glass tube bending apparatus comprising a support member, a pair of spaced aligned holders mounted on said support member for gripping and supporting a glass tube in axial alignment therewith, at least one of said holders being pivotable on said support member about an axis extending transversely of and offset to one side of the glass tube in the holders and located between the said holders, and means for heating and softening a zone of the tube adjacent the pivot axis of the said one holder, said holders being arranged for relative axial movement towards one another to upset the softened glass portion of the tube and the said one holder being arranged to be swung about its pivot axis in a direction the same as that in which the said pivot axis is offset from the glass tube to thereby bend the said tube.

3. Glass tube bending apparatus comprising a support member, a pair of spaced aligned holders mounted on said support member for gripping and supporting a glass tube in axial alignment therewith, at least one of said holders being pivotable on said support member about an axis extending transversely of and offset to one side of the glass tube in the holders and located between the said holders, means for heating and softening a zone of the tube adjacent the pivot axis of the said one holder, said holders being arranged for relative axial movement towards one another to upset the softened glass portion of the tube, and a forming pin arranged to be positioned across the tube on the same side thereof as the said pivot axis, the said one holder being arranged to be swung about its pivot axis in a direction to bend the tube around the said pin.

4. Glass tube bending apparatus comprising a support member, a pair of spaced aligned holders rotatably mounted on said support member to rotate about their aligned axes and arranged to grip and support a glass tube in axial alignment therewith, at least one of said holders being pivotable on said support member about an axis extending transversely of and offset to one side of the glass tube in the holders and located between the said holders, means for heating and softening a zone of the tube adjacent the pivot axis of the said one holder, and means cooperable with said holders when aligned to rotate them in unison about their aligned axes, said holders being arranged for relative axial movement towards one another to thereby upset the softened glass portion of the tube and the said one holder being arranged to be swung about its pivot axis in a direction the same as that in which the said pivot axis is offset from the glass tube to thereby bend the said tube.

5. Glass tube bending apparatus comprising a support member, a pair of spaced aligned holders rotatably mounted on said support member to rotate about their aligned axes and arranged to grip and support a glass tube in axial alignment therewith, at least one of said holders being pivotable on said support member about an axis extending transversely of and offset to one side of the glass tube in the holders and located between the said holders, means for heating and softening a zone of the tube adjacent the pivot axis of the said one holder, means cooperable with said holders when aligned to rotate them in unison about their aligned axes, said holders being arranged for relative axial movement towards one another to thereby upset the softened glass portion of the tube, and a forming pin arranged to be positioned across the tube on the same side thereof as the said pivot axis, the said one holder being arranged to be swung about its pivot axis in a direction to bend the tube around the said pin.

6. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, and means for heating and softening a zone of the tube adjacent the pivot axis of said arms, said holders being arranged for relative movement towards one another to upset the softened glass portion of the tube and said arms being arranged to be swung about their pivot axis in a direction opposite to that in which the tube is offset from the said pivot axis to thereby bend the said tube.

7. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, said holders being rotatably mounted on their respective support arms to rotate the glass tube about its axis, means for heating and softening a zone of the tube adjacent the pivot axis of said arms, and means cooperable with said holders to rotate them in unison, said holders being arranged for relative movement towards one another to upset the softened glass portion of the tube and the said arms being arranged to be swung about their pivot axis in a direction opposite to that in which the tube is offset from the said pivot axis to thereby bend the tube.

8. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, means for heating and softening a zone of the tube adjacent the pivot axis of said arms, said holders being arranged for relative axial movement towards one another to upset the softened glass portion of the tube, and a forming pin arranged to be positioned across the tube on the same side thereof as the pivot axis of the arms, said arms being arranged to be swung about their pivot axis in a direction to bend the tube around the said pin.

9. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, said holders being movable longitudinally of their respective support arms, means for heating and softening a zone of the tube adjacent the pivot axis of said arms, means cooperable with said holders to move them towards one another to thereby upset the softened glass portion of the tube, and a forming pin extending transversely of the plane of pivotal movement of said arms and movable longitudinally from a normally retracted position removed from the glass tube supported on said arms to an advanced operative position contiguous to and extending across the tube on the same side thereof as the pivot axis of the arms, said arms being arranged to be swung about their pivot axis in a direction to bend the tube around the said pin.

10. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, said holders being movable longitudinally of their respective support arms, means for heating and softening a zone of the tube adjacent the pivot axis of said arms, means cooperable with said holders to move them towards one another to thereby upset the softened glass portion of the tube, a forming pin extending transversely of the plane of pivotal movement of said arms and normally located in a retracted position removed from the glass tube supported on said arms, and pin actuating means co-acting with the said forming pin to move it longitudinally from its said retracted position to an advanced operative position contiguous to and extending across the tube on the same side thereof as the pivot axis of the arms, said arms being arranged to be swung about their pivot axis in a direction to bend the tube around the said pin.

11. Glass tube bending apparatus comprising a support member, a pair of swivel arms each pivotally mounted at one end on said support member to pivot about a common axis, said arms normally extending oppositely away from each other and having holders for gripping a glass tube and supporting it in a position extending alongside the arms and offset from their pivot axis, said holders being movable longitudinally of their respective support arms and rotatably mounted thereon to rotate the glass tube about its axis, means for heating and softening a zone of the tube adjacent the pivot axis of said arms, means cooperable with said holders to rotate them in unison, other means also cooperable with said holders to move them towards one another, while permitting rotation thereof, to thereby upset the softened glass portion of the tube, and a forming pin arranged to be positioned across the tube on the same side thereof as the pivot axis of the arms, said arms being arranged to be swung about their pivot axis in a direction to bend the tube around the said pin.

12. Glass tube bending apparatus comprising a support member, a pair of spaced aligned holders mounted on said support member and arranged to grip and hold a glass tube in axial alignment therewith, at least one of said holders being pivotable on said support member about an axis extending transversely of and offset to one side of the glass tube in the holders and located between the said holders, heating means arranged to heat and soften a zone of the tube adjacent the pivot axis of the said one holder, a forming pin normally located in a position removed from the glass tube in said holders, and control means for simultaneously rendering the heating means inoperative and moving the said pin to a position contiguous to and extending across the tube on the same side thereof as the pivot axis of the said one holder, the said one holder being arranged to be swung about its pivot axis in a direction to bend the tube around the said pin.

EDWARD B. NOEL.